Patented July 21, 1942

2,290,642

UNITED STATES PATENT OFFICE 2,290,642

VULCANIZATION OF RUBBER

Paul C. Jones, Silver Lake, and Roger A. Mathes, Akron, Ohio, assignors to The B. F. Goodrich Company, New York, N. Y., a corporation of New York No Drawing. Application November 15, 1940, Serial No. 365,786

10 Claims. (Cl. 260—787)

This invention relates to the vulcanization of rubber and to rubber compositions vulcanized in the presence of the accelerators herein described.

It has long been known that the time required for vulcanization of rubber can be greatly reduced by the employment of materials commonly known as accelerators. We have discovered the thiazolinyl disulfides to be exceedingly efficient accelerators for rubber vulcanization.

This class of compounds has never before been used for the acceleration of rubber vulcanization, largely because of the recorded inactivity of the 2-mercapto thiazolines from which they are derived. Since mercaptobenzothiazole, an excellent accelerator, is more active than its corresponding disulfide, the same relationship would be expected between the mercaptothiazolines and the corresponding disulfides. However, we have found that, contrary to expectations, the thiazolinyl disulfides are considerably more active than the mercapto thiazolines from which they are derived.

The accelerators of our invention may be prepared by oxidation of the corresponding mercapto thiazoline by means of a suitable oxidizing agent such as sodium hypochlorite, sodium persulfate, sodium nitrite, nitric acid, hydrogen peroxide, sodium perchlorate, etc., as follows:

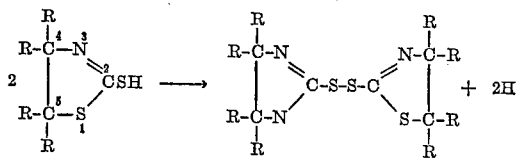

where R is hydrogen, or an alkyl, aryl, or alkoxy group. Two of the R groups on adjacent carbon atoms may be joined to form a reduced cyclic group containing three or more carbon atoms. Mercapto thiazolines which yield suitable disulfides include such compounds as 2-mercapto thiazoline; 2-mercapto 4-methyl thiazoline; 2-mercapto 4-phenyl thiazoline; 2-mercapto 5-ethyl thiazoline; 2-mercapto 4-methoxymethyl thiazoline; 2-mercapto 4,5-dimethyl thiazoline; 2-mercapto 4,5-diethyl thiazoline; 2-mercapto 4-p-aminophenyl thiazoline; 2-mercapto 4,5-tetramethylene thiazoline; and the like.

We have also found that materials which activate mercapto thiazoline, such as monocarboxylic acids and their metallic salts, as disclosed in our copending application Serial No. 255,358, filed February 8, 1939, also serve as activators for our new accelerators.

The acid used to activate the accelerator may be any monocarboxylic acid, saturated or unsaturated, such as lauric, stearic, caprylic, oleic, linoleic, palmitic, benzoic, salicylic, or the like; or the salts of these acids with metals such as zinc, lead, tin, sodium, calcium, magnesium, or any other alkali, alkaline earth, or heavy metals may be used. It is preferred to use the higher fatty acids, but the lower acids may be used, preferably in the form of the metal salts. Beneficial effects are obtained by using very small amounts of the acids or their salts; however, the best results are achieved by the presence of 1% to 5% or more of these activators.

As evidence of the effectiveness of our new accelerators the following compositions were prepared:

|  | A | B | C | D |
|---|---|---|---|---|
| Rubber | 100.0 | 100.0 | 100.0 | 100.0 |
| Sulfur | 3.5 | 3.5 | 3.5 | 3.5 |
| Zinc oxide | 5.0 | 5.0 | 5.0 | 5.0 |
| Lauric acid | 0.0 | 3.0 | 0.0 | 3.0 |
| Dithiazolinyl disulfide | 1.0 | 1.0 | 0.0 | 0.0 |
| Bis(5-methyl thiazolinyl) disulfide | 0.0 | 0.0 | 1.0 | 1.0 |

After curing in a mold at 287° F., the compositions above had the following properties, where T=tensile strength in pounds per square inch and E=elongation in per cent:

| Cure time in min. | A | | B | | C | | D | |
|---|---|---|---|---|---|---|---|---|
|  | T | E | T | E | T | E | T | E |
| 15 | 2,440 | 865 | 2,940 | 780 | 2,860 | 880 | 3,490 | 815 |
| 30 | 2,810 | 845 | 3,960 | 745 | 3,070 | 835 | 4,070 | 745 |
| 60 | 2,860 | 805 | 3,470 | 670 | 3,110 | 830 | 3,620 | 690 |
| 120 | 2,860 | 805 | 2,740 | 655 | 2,950 | 840 | 2,840 | 655 |

From these results it is apparent that although the activating effect of the acid is appreciable, nevertheless good cures and good tensile strengths are obtained even in the absence of the activator.

These new accelerators are effective not only with natural rubber or caoutchouc, but also with balata, gutta-percha, latex, rubber isomers, or any synthetic rubber which can be vulcanized, that is, which loses its property of thermoplasticity and becomes elastic, when heated in the presence of sulfur, and the term "a rubber" is used in the claims to designate all of the above-mentioned materials. Pigments, fillers, reinforcing agents, softeners, antioxidants, other accelerators, etc. may be present in the rubber composition.

The accelerators of our invention are not limited to any particular compositions, but may be used for pneumatic or solid tires, footwear, hose, tubes, surgical goods, belting, dipped articles, and all manner of rubber goods.

The method of vulcanization used is not limited to that disclosed in the specific examples, but includes heating the rubber composition with steam, hot air, hot water, etc.

Although we have herein disclosed specific examples of our invention, we do not intend to limit ourselves solely thereto, for many modifications and variations lie within the spirit and scope of the invention as defined in the appended claims.

We claim:

1. The process of vulcanizing a rubber in the presence of dithiazolinyl disulfide and a number of the class consisting of monocarboxylic acids and their metallic salts.

2. The process of vulcanizing a rubber in the presence of bis(5-methyl thiazolinyl) disulfide and a member of the class consisting of monocarboxylic acids and their metallic salts.

3. The process of vulcanizing a rubber in the presence of dithiazolinyl disulfide and lauric acid.

4. The process of vulcanizing a rubber in the presence of bis(5-methyl thiazolinyl) disulfide and lauric acid.

5. A composition comprising a rubber vulcanized in the presence of dithiazolinyl disulfide and of a member of the class consisting of monocarboxylic acids and their metallic salts.

6. A composition comprising a rubber vulcanized in the presence of bis(5-methyl thiazolinyl) disulfide and of a member of the class consisting of monocarboxylic acids and their metallic salts.

7. A composition comprising a rubber vulcanized in the presence of dithiazolinyl disulfide and lauric acid.

8. A composition comprising a rubber vulcanized in the presence of bis(5-methyl thiazolinyl) disulfide and lauric acid.

9. The process of vulcanizing a rubber in the presence of a thiazolinyl disulfide containing no substituent groups other than alkyl, alkylene, alkoxy, and aryl groups, and of a member of the class consisting of monocarboxylic acids and their metallic salts.

10. A composition comprising a rubber vulcanized in the presence of a thiazolinyl disulfide containing no substituent groups other than alkyl, alkylene, alkoxy, and aryl groups, and of a member of the class consisting of monocarboxylic acids and their metallic salts.

PAUL C. JONES.
ROGER A. MATHES.